Feb. 3, 1931.  A. G. JASINSKI  1,791,274
LICENSE PLATE AND SIGN DISPLAY UNIT
Filed Oct. 8, 1928  4 Sheets-Sheet 1
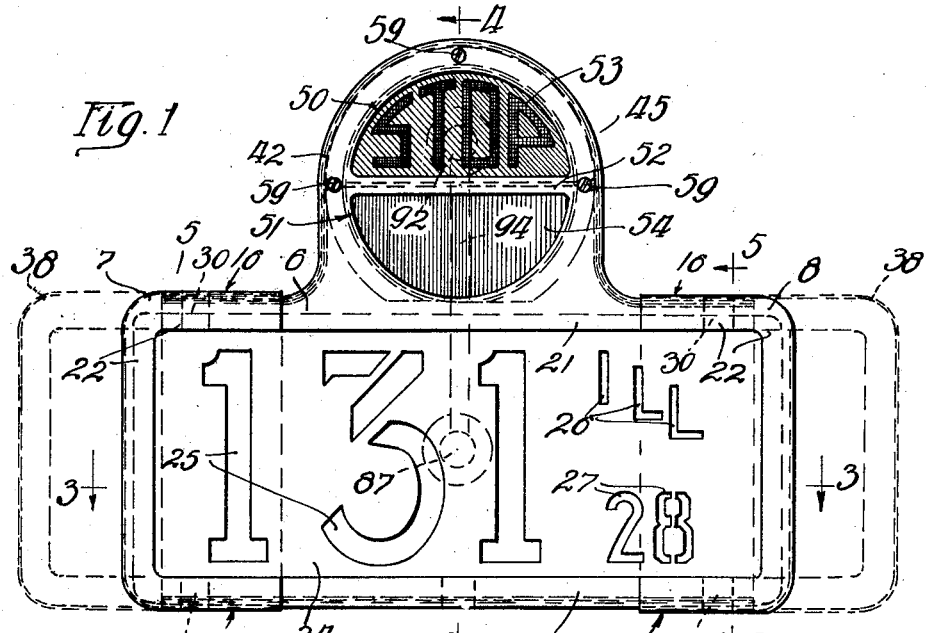
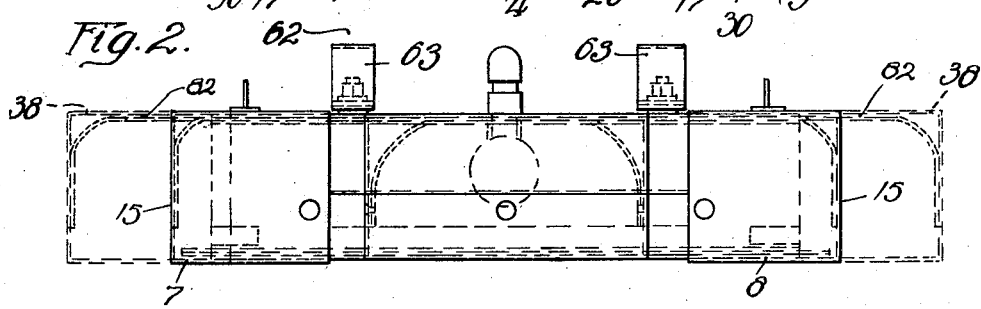
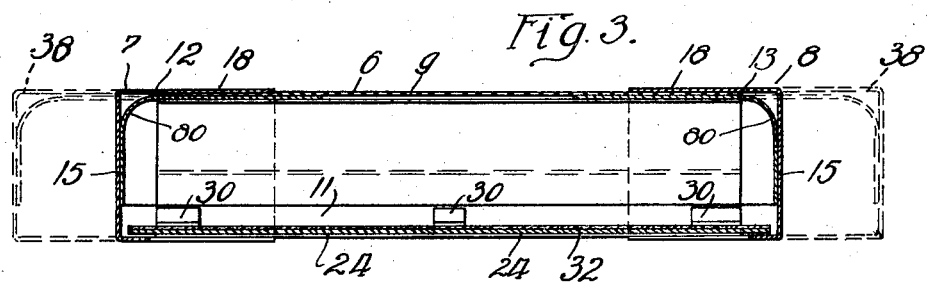
Inventor:
Andrew G. Jasinski.
By Brown, Jackson, Boettcher & Dienner
Attys.

Feb. 3, 1931. A. G. JASINSKI 1,791,274
LICENSE PLATE AND SIGN DISPLAY UNIT
Filed Oct. 8, 1928 4 Sheets-Sheet 2
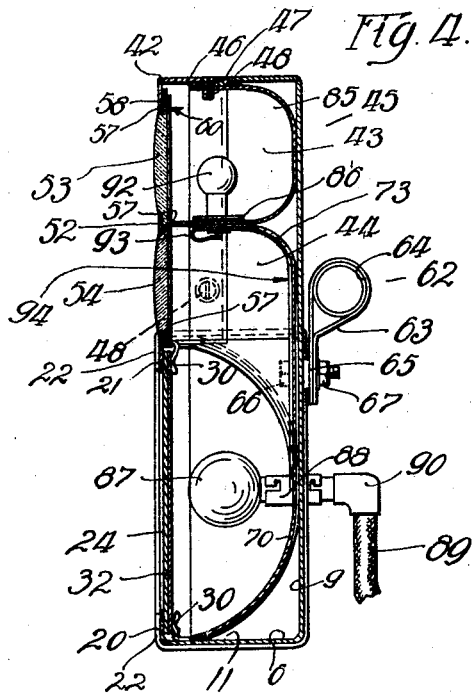
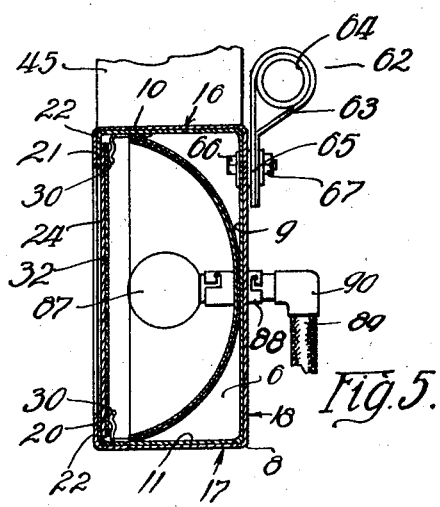
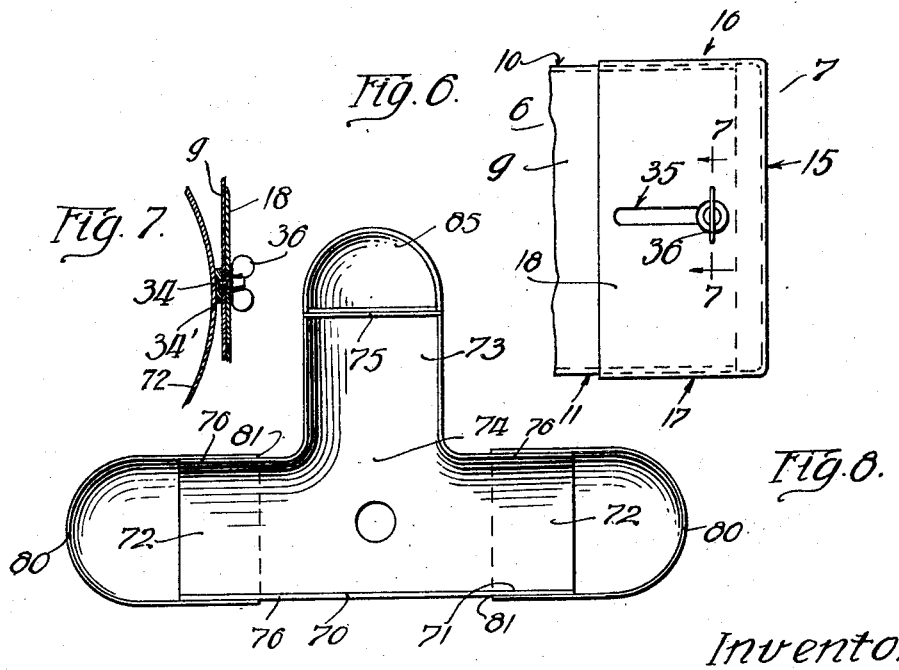
Inventor:
Andrew G. Jasinski
By Brown, Jackson, Boettcher & Dienner
Attys.

Feb. 3, 1931.  A. G. JASINSKI  1,791,274
LICENSE PLATE AND SIGN DISPLAY UNIT
Filed Oct. 8, 1928  4 Sheets-Sheet 3
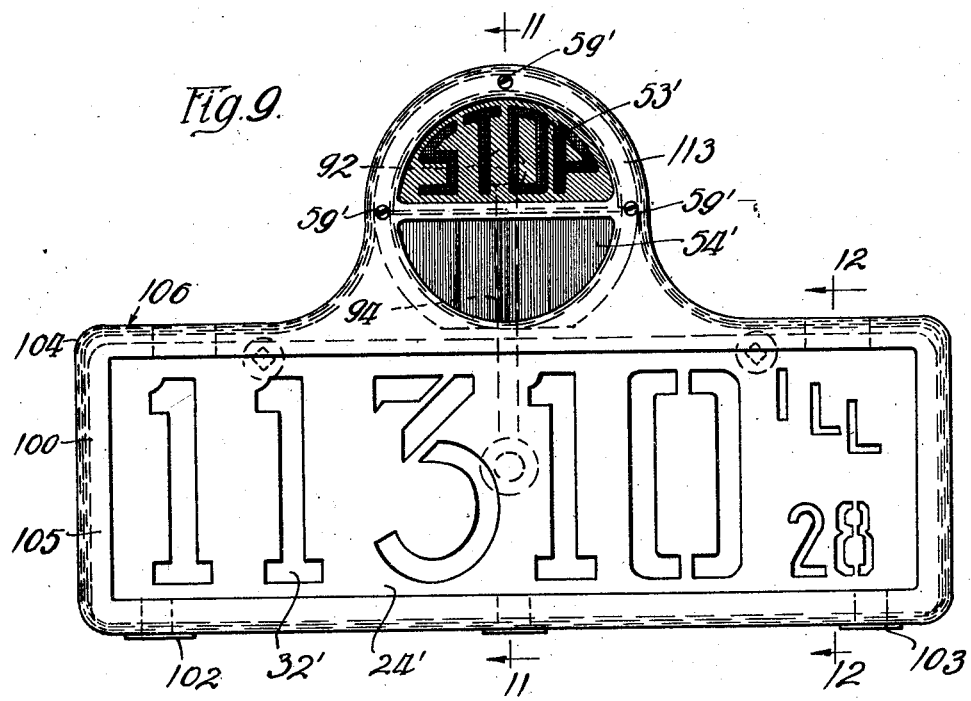
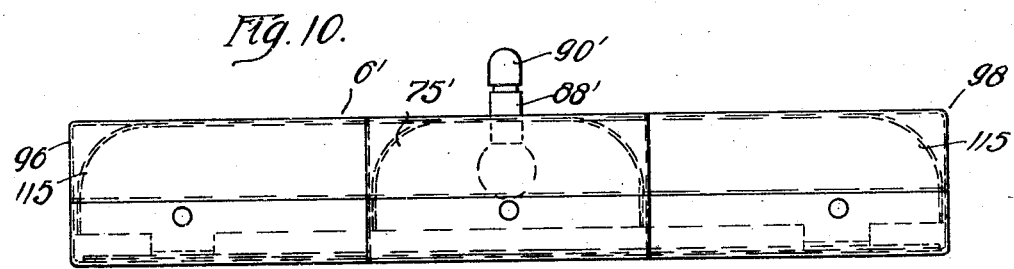
Inventor:
Andrew G. Jasinski.
By Brown, Jackson, Boettcher & Dienner
Attys.

Feb. 3, 1931.  A. G. JASINSKI  1,791,274
LICENSE PLATE AND SIGN DISPLAY UNIT
Filed Oct. 8, 1928   4 Sheets-Sheet 4
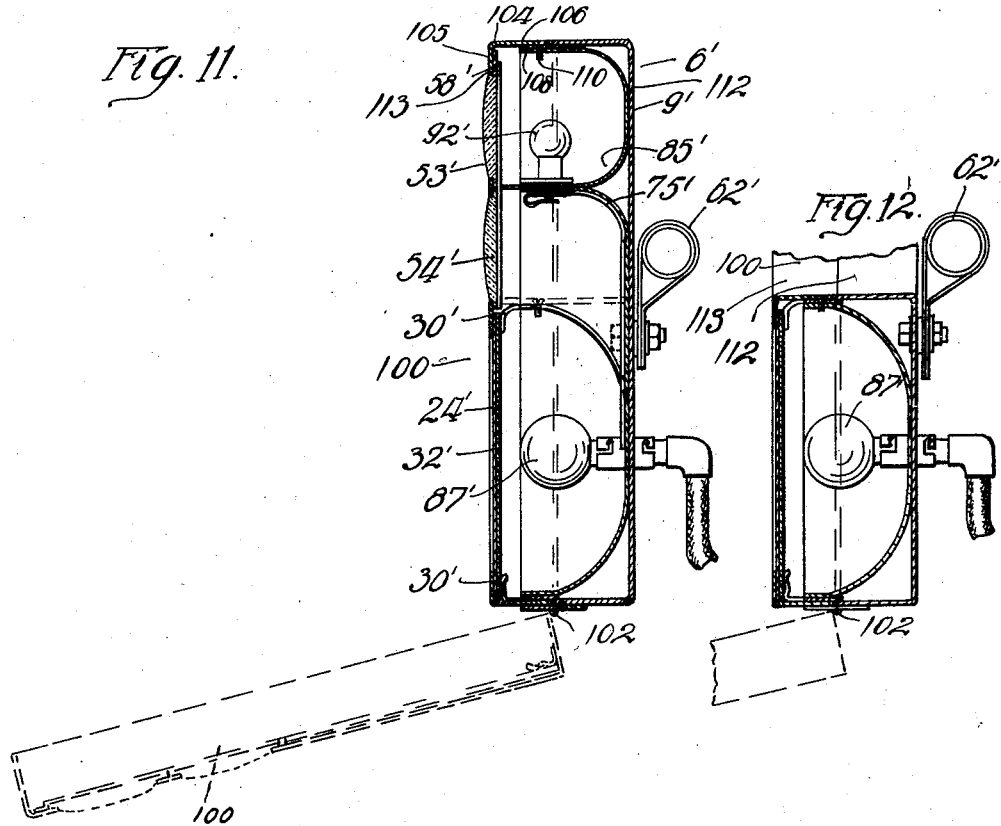
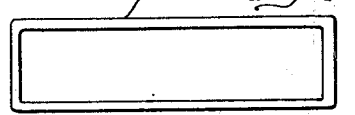
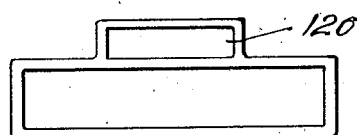
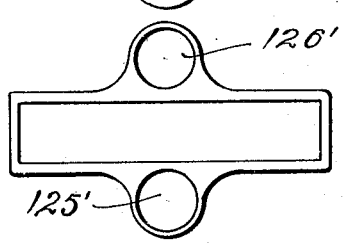
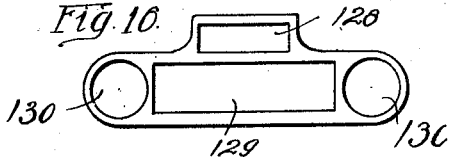
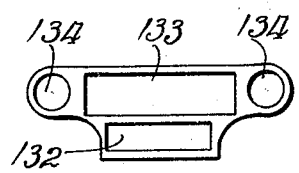
Inventor:
Andrew G. Jasinski.
By Brown, Jackson, Boettcher & Dienner
Attys.

Patented Feb. 3, 1931

1,791,274

UNITED STATES PATENT OFFICE

ANDREW G. JASINSKI, OF CHICAGO, ILLINOIS

LICENSE-PLATE AND SIGN-DISPLAY UNIT

Application filed October 8, 1928. Serial No. 311,050.

This invention relates to improvements in license plate units, and particularly to improvements in license plate holders and display devices such as are commonly employed on motor vehicles and the like.

It is old prior to my invention to arrange an electric lamp or group of electric lamps in back of the license plate or sign so that the rays of light will pass through or around the license numbers or other characters or matter for display to improve the visibility thereof, particularly at night.

Heretofore the devices proposed for accomplishing this have been relatively complicated, expensive and unsuitable in appearance. These devices have also usually been unsuited for use with license plates or signs of different lengths, and replacement or adjustment, even where possible, has been difficult.

It is an object of the present invention to provide a device of generally improved and simplified construction and pleasing appearance that may be economically produced and conveniently adjusted to license plates or signs of different sizes.

Another object is the provision of a generally improved casing construction permitting convenient replacement and adjustments, and where desired, convenient adjustment to plates of different sizes and an improved reflector structure for utilizing the light rays to greatest advantage and which may be adjustable with the casing to plates of different sizes.

The device of the present invention is capable of being applied either as a front or rear license plate unit. Where the device is employed at the rear of the vehicle the present invention provides a generally improved and simplified stop and tail light structure combined as a unit therewith. It is to be understood, of course, that where the license plate unit is employed at the front of the vehicle the stop and tail light structure may be omitted and the license plate unit employed alone, or where this unit is to be employed at the front of the vehicle it may be supplemented with a city license plate holder and display device as well as with any other holders and display devices or any desired combination thereof. The rear license plate unit and tail and stop light combination may, of course, be similarly supplemented with other holders and display devices, as desired.

Now in order to acquaint those skilled in the art with the manner of constructing and using a device according to my present invention, I shall describe the invention in connection with the accompanying drawings, in which Fig. 1 is a front elevational view of a device embodying the present invention.

Fig. 2 is a top plan view of the device shown in Fig. 1.

Fig. 3 is a horizontal section taken on the line 3—3 Fig. 1.

Fig. 4 is a vertical section taken on the line 4—4 Fig. 1.

Fig. 5 is a fragmentary vertical section taken on line 5—5 Fig. 1.

Fig. 6 is a fragmentary rear elevational view showing means for fastening the adjustable ends of the casing in place.

Fig. 7 is a fragmentary detail section taken on the line 7—7 of Fig. 6.

Fig. 8 is a front elevational view of the main stationary reflector and adjustable reflector ends, taken on a reduced scale.

Fig. 9 is a front elevational view similar to Fig. 1 of another embodiment of the invention.

Fig. 10 is a top plan view of the embodiment shown in Fig. 9.

Fig. 11 is a vertical section taken on the line 11—11 of Fig. 9.

Fig. 12 is a fragmentary vertical section taken on the line 12—12 of Fig. 9; and Figs. 13, 14, 15, 16, 17 and 18 are more or less diagrammatic front elevational views, all taken on a reduced scale and illustrating various holders and display combinations with the license plate unit of the present invention which may be of the telescoping or stationary type as hereinafter described.

Referring first to the embodiment of Figs. 1 to 8, the device illustrated therein comprises a generally rectangular casing 5, which casing 5 is composed of an intermediate casing portion 6 and adjustable end portions 7 and 8 having telescopic engagement therewith. The intermediate casing portion 6 has a back wall 9 with top and bottom walls 10 and 11 turned or extending substantially normal thereto, and the opposite ends of the stationary intermediate casing portions are open as indicated at 12 and 13 in Fig. 3.

Telescoping over these open ends 12 and 13 of the casing portion 6 are the end portions 7 and 8, and each of these end portions 7 and 8 has an end wall 15 which forms the end walls of the casing and top, bottom and back walls 16, 17 and 18 which snugly surround the top, bottom and back walls of the opposite open ends of the casing portion 6 and have sliding telescopic engagement therewith.

The bottom wall 11 of the casing portion 6 is provided along the front of the device with an up-turned marginal flange 20, and the top of the casing portion 6 may be provided with a similar depending marginal flange 21. The end portions 7 and 8 have similar flanges 22 along the front of the top, bottom and end walls, these flanges 22 forming extendible continuations of the flanges 20 and 21 and serving with the flanges 20 and 21 as a marginal retention frame for the margin or periphery of the license plate 24. The license plate 24 is the State license plate which must now be universally displayed at the front and rear of the vehicle, and this plate is preferably of sheet metal with the license numbers 25, State designations 26 and date 27 stenciled therein, preferably by cutting out the numbers and other designations as shown, although it is to be understood that the designating marks may be left solid and the field around the same cut out as desired, or the designations or field instead of being entirely cut out may be merely line stenciled or perforated in, as desired.

Internally the stationary or central portion 6 of the box or casing 5 is provided with suitable spring clips 30 welded or fastened by other means along the top and bottom walls 10 and 11 and adjacent the flanges 20 and 21 for holding the license plate 24 and behind the license plate the glass or other suitable transparent or translucent pane or plate 32 which covers the openings forming the numbers 25 and other designations 26 and 27, and prevents the entry of dust, water or other foreign matter into the inside of the box or casing.

At the same time the transparent or translucent plate 32 permits the direct and reflected rays of light to pass through the openings and display the license numbers and other markings clearly and distinctly on the car at all times.

For the purpose of securing the end portions 7 and 8 firmly in any adjusted position and at the same time permitting convenient release and adjustment of these end portions, the opposite ends of the back wall 9 of the stationary or intermediate casing or box portion 6 are provided with wing bolts or screws 36, the threaded stems or shanks 34 of which pass through suitable openings 35 in the back walls 18 and have threaded engagement with the back walls 9 of the stationary intermediate casing part 6. The places of threaded engagement of the threaded shanks 34 with the back walls 18 may be thickened and reinforced by pieces 34' (Fig. 7) welded or otherwise secured to the inner surfaces of the back walls 9 and having threaded engagement with the shanks 34. The openings 35 are in the form of longitudinally elongated slots, permitting extension and retraction of the box ends 7 and 8, and the winged heads of the bolts or screws 36 are adapted to be drawn up into engagement with the walls 18 to firmly clamp the box ends in any desired position. The slots 35 may be closed, as shown, and of lengths sufficient to permit the ends 7 and 8 or either of said ends to be extended sufficiently to receive the license plate between them, whereupon these ends may be closed together or retracted upon the ends of the plate with the end flanges 22 engaging over the ends of the license plate as shown. Of course instead of the wing screws 36 threaded stems and removable wing nuts could be employed, and it will be understood that either or both slots 35 may open from the inner ends of the box ends 7 and 8 to permit complete removal of either or both said box ends if desired.

In use, with one or both of the end portions 7 or 8 extended or removed, the license plate 24 and transparent or translucent plate 32 are assembled as shown in Figs. 3, 4 and 5, and slipped in endwise from the open ends of the casing as by sliding them in between the front retention flanges 20 and 21 and the spring clips 30, which clips 30 yieldingly press the upper and lower margins of the plate 24 against the flanges 20 and 21, and hold the plate and pane firmly in place and against vibration or rattling. It is to be understood, of course, that suitable packing pieces or gaskets may be employed if desired. The license plate 24 and plate 32, which may be of glass, non-breakable glass or other suitable transparent or translucent material and of a size conforming with the license plate, are preferably disposed with their vertical median portions on the vertical median portion of the casing part 6, and the end portions 7 and 8 are then brought up on the ends of the license plate and clamped firmly and securely to the intermediate casing part 6 by the wing nuts or bolts 36. The flanges 22 with the flanges 20 and 21 form a marginal retention flange about the entire marginal periphery of the license plate, giving a pleasing and finished appearance and at the same time affording a sturdy structure and a firm mounting for said plate and pane. Where the license plate is longer, as is the case with a plate bearing four or more digits instead of three digits as shown, the nuts or bolts 36 are loosened and the end portions 7 and 8 extended as shown in dotted lines at 38, 38 to accommodate the longer plate or where the plate is shorter these ends 7 and 8 are moved in to accommodate the shorter plate. In this manner the length of the casing is conveniently adjusted to conform with license plates or signs of different lengths, properly and pleasingly conforming with all plates without any plate extension in one instance or box or casing extension in another instance. Therefore the present device is not only adapted for holding and displaying plates of different sizes but actually conforms the lamp, box or casing to the size of the plate with an accompanying advantageous utilization of the light rays through the plate in all positions of adjustment of the device.

Where the device is to be used, for example, at the front of the vehicle and without any provision for holding and displaying the city license, for example, or other plates the top of the intermediate box or casing portion 6 may be extended straight across as indicated at 110 in Fig. 13.

Where the device is to be used at the rear of the vehicle a combination stop and tail light is preferably embodied as a unitary part of the license plate holder and display device as shown in Figs. 1 to 8. Where the tail and stop light structure is combined as a unit with the license plate holder and display device the lower flange 20 of the casing or box portion 6 is formed integral with the bottom wall 11 but the upper flange 21 may be wholly or partially removable and may constitute an integral part of the removable front portion 42 for the upper stop and tail light compartments 43 and 44. The top 10 of the box or casing 5 has in this case an upwardly extending, centrally disposed and generally rounded portion 45, the back of which may be closed by an upward extension of the back wall 9 as indicated in Fig. 4. The removable front 42 is provided with an inwardly directed marginal flange 46 conforming with the upwardly rounded portion 45 of the casing and overlapping same as indicated at 47 in Fig. 4 and secured thereto as by means of screws 48. The opposite ends of the removable cover 42 may extend out sufficiently to be overlapped or telescoped by the adjustable ends 7 and 8, and the inturned marginal flange 46 may extend along the top 10 of the box-like casing to the ends of the removable wall 42 and may be similarly secured to the top wall 10.

The front of the removable plate 42 is provided with two semi-circular openings 50 and 51 separated by an integral cross strip 52, the opening 50 being at the front of the stop light compartment 43 and the opening 51 at the front of the tail light compartment 44 with the strip 52 extending horizontally across the front of the dividing partition between said compartments.

The opening 50 is closed by a semi-circular pane of glass or other suitable transparent or translucent material, which pane is indicated at 53. The pane 53 is preferably green or some other distinctive color and may be provided with the word "Stop" as indicated. The underlying opening 51 is covered or closed by a pane 54 also of glass or other suitable transparent or translucent material, and this pane 54 is preferably red to convey a tail light indication in accordance with the requirements as well understood in the art. Marginally the panes 53 and 54 are reduced to fit in the openings 50 and 51 and to provide retention flanges 57 interlocking internally with the inner margins of the strip 52 and plate 42 and an annular ring 58 removably secured to the removable front plate 42 as by means of screws 59 removably holds the panes 53 and 54 in place. The ring 58 is offset or reset at 60 to receive the adjacent retention flanges 57 of the panes 53 and 54, as shown in Fig. 4. It will now be apparent that convenient access to either or both of the compartments 43 and 44 may be had by removing the screws or securing means 48 and then removing the removable front wall or plate 42 and that either or both panes or lenses 53, 54 may be removed or replaced by removing the screws 59 which releases the ring 58 and permits removal of the panes.

Obviously by removing the plate 42 the panes 53 and 54 and clamping ring 58 may be replaced and held in place from the rear while the screws or other fastening elements 59 are inserted, and upon replacing the panes 53 and 54 the plate 42 with the panes 53 and 54 and ring 58 as a unitary part thereof may be conveniently replaced and secured by the screws 48.

For the purpose of mounting or attaching the device to the vehicle the back wall 9 of the casing 5 is provided with a suitable attaching or mounting means designated generally at 62. This attaching or mounting means 62 comprises a pair of metallic straps 63 each preferably of liberal width and adapted to encircle or surround the support or bracket 64, being preferably sufficiently springy or yieldable to be bound or clamped firmly to the member 64. The free ends of the straps 63 are brought together at 65 and clamped to the back of the casing 5 as by means of suitable bolts 66 having their rear exposed ends in threaded engagement with nuts 67. The bolts 66 firmly fasten the straps 63 to the stationary intermediate part 6 of the casing, and it is to be understood that the support 64 may be a suitable rod or bracket secured to the vehicle for supporting the present unit. The support 64 while shown of circular and tubular section may, of course, be solid and of any other configuration.

While as already pointed out the panes 53 and 54 are preferably of glass, these panes may, of course, be of mica, celluloid or other suitable material, and it is to be understood that the use of unbreakable glass is contemplated throughout the entire unit. The pane 32 may likewise be of ordinary glass, unbreakable glass, celluloid or other suitable material, and this pane 32 is preferably of a color which is different than the color of the license plate 24 and which will contrast with said plate and cause the numerals 25 and other designations to stand out clearly and sharply not only when the unit is lighted internally at night but when unlighted as during the day.

While I contemplate the omission of any internal reflectors in which case the compartments 43 and 44 may be divided by a suitable partition while the inner surfaces of all compartments and the telescoping ends may be highly plated and polished to form suitable reflectors, in the embodiment illustrated the main or stationary compartment 6 is provided internally with a reflector 70. The reflector 70 which is shown in detail in Fig. 8 constitutes the stationary reflector of the device. This reflector 70 has lateral extensions 72 which are concave or rounded rearwardly about a common horizontal axis and extending upwardly from the intermediate portion of the upper margin and between the lateral extensions 72 is a concave reflector pocket 73 opening downwardly at 74 to the main or horizontal cross pocket of the reflector. The forwardly extending rim 75 covers the top and sides of the upright reflector pocket, the bottom of which is open to the main cross pocket, the opposite ends of which are covered at top and bottom by the forwardly curving margins 76. The length from end to end of the lateral extensions 72 is substantially the same as the length of the main casing part 6, and the upwardly extending pocket 73 defines the tail light compartment 44 with the upper edge of the forwardly turned reflector rim 75 rearwardly in line with the horizontal strip 52. The reflector 70 may be welded or otherwise suitably secured to the stationary back of the stationary casing part 6, or may be fastened by means of the lamp socket 88 in a suitable manner so that upon removing the socket 88 the reflector may be easily removed.

The lateral reflector extensions 72 are supplemented by end reflectors 80 carried by and adjustable with the end portions 7 and 8 of the casing although not necessarily fastened thereto. The adjustable end reflectors 80 are hollow or rounded forwardly at the outer ends and at the top and bottom, the curvature or rounding from top to bottom conforming with the curvature or rounding of the lateral extension 76 and the inner open ends 81 rearwardly overlapping the lateral extensions 72 and having telescopic or sliding cooperation therewith so that when the casing ends 7 and 8 are extended or retracted the reflector ends 80 will be extended or retracted therewith to correspondingly increase or decrease the lengths of the lateral reflector extensions. The adjustable reflectors 80 thereby constitute the telescoping reflector ends, and these ends may be welded or otherwise rigidly secured within the casing ends 7 and 8, or may be left free by not being fastened, the rear walls of the reflector ends 80 being spaced from the back walls of the casing ends 7 and 8 as shown in Fig. 3 for sliding or telescopic engagement between the back wall 9 of the stationary casing part 6 and the back of the stationary reflector 70. The particular contours of the reflectors may, of course, be varied as desired.

The upper stoplight compartment is provided with and defined by a rearwardly concave and rounded and forwardly open reflector 85 having the bottom of its forward margin suitably secured at 86 to the top of the upright reflector portion 73, as shown in Fig. 4.

The source of illumination or light for the license plate 24 and tail light pane 54 is preferably in the form of a single incandescent lamp 87, although a number of lamps could be employed, which may be disposed at the focal point of the semi-cylindrical contour of the reflector 70 and centrally between the opposite ends of the reflector 70 as well as centrally beneath the upright reflector portion 73.

The electric lamp 87 is detachably supported by a socket 88 suitably mounted in the back wall of the stationary casing part 6 with one end extending into the casing, and the other end exposed from the rear thereof. The conductors 89 for supplying the lamp 87 connect the lamp in the usual lighting circuit of the vehicle which is ordinarily provided with a suitable switch for turning on the lighting circuit at night and for turning the same off during the day. The conductors 89 may have a suitable connector 90 for quick detachable connection with the socket 88 or with a connector or adaptor thereon. The single electric lamp 87 forms a common source of light for illuminating the license plate 24 and for conveying the tail light indication through the pane 54, the rays of light from the lamp 87 being effectively diffused through the numeral and other openings 25, 26 and 27, and being effectively spread through the lateral extensions 72 and adjustable reflector ends 80 as well as up into the reflector portion 73, and reflected and directed uniformly over the back of the entire license plate and uniformly through the tail light pane 54.

The upper compartment 43 is separately lighted or illuminated by an electric lamp 92 having quick detachable support and electric connection as upon a suitable spring clip 93. The spring clip 93 or other electrical connection for the lamp 92 is supplied through a suitable conductor 94 which may be in the form of a thin metallic strip or ribbon extending along the upright reflector portion 75 and suitably insulated therefrom.

The lower end of the conductor 94 may be suitably connected through the socket opening for the socket 88 with a conductor forming a part of the conductor 89 and of course insulated from the conductors supplying the lamp 87 as well as from the electrical connections to said lamp 87. In practice the circuits for the lamps 87 and 92 will preferably be separate single conductor circuits suitably grounded as is well understood in the art, the grounding for the lamp 92 being preferably adjacent the clip 93. The conductor 94 is preferably connected into the usual stop light circuit to be operated from the brake of the machine as is well understood.

In the embodiment of Figs. 9 to 12 the adjustable casing ends 7 and 8 are omitted and the stationary casing part 6' is provided with integral closed ends 96 and 98. In this case the entire front 100 is hinged along the lower margin of the front of the box 6' at 102 and 103 to be swung into open position as shown in dotted lines in Fig. 11. The particular hinged front 100 shown comprises a generally rectangular frame portion 104 having the surrounding flange 105 corresponding to the flanges 20, 21 and 22 of the previous embodiment, and the rearwardly directed flange 106 which telescopes over the inset front margin 108 of the generally rectangular and open front box 6' and is hinged along its lower margin at 102 and 103 to the adjacent lower margin of box 6'. Screws or other suitable fastening elements 110 secure the cover in closed position and merely by removing the screws the entire cover may be swung about the hinges 102 and 103 for quick and convenient access to the entire inside of the device.

Where the tail and stop light provisions of the previous embodiment are combined with the device the top of the box and the top of the cover are provided with the upright extensions 112 and 113, as before, and the tail and stop light panes 54' and 53' may be detachably secured to the upwardly raised portion of the cover by screws 59' and ring 58', as before. In this case the adjustable or telescoping reflector extensions 80 are also omitted, and the generally semi-cylindrical main reflector portions are provided with integral rounded or concave ends 115. Otherwise the reflector 75' is substantially the same as the reflector 70 of the previous embodiment, being provided with the upright tail light reflector portion 75'. The reflector 85' is substantially the same as the reflector 85 of the previous embodiment. The mounting means 62' may be as described in connection with the previous embodiment, and the single stationary reflector for the license plate 24' and tail light pane 54' may be mounted within the casing as before or otherwise as desired. The license plate 24' and translucent or transparent pane 32' are held in the hinged cover by the spring clips 30' welded or otherwise fastened to the front hinged portion. The single electric lamp for illuminating the license plate and tail light pane is indicated at 87' as before, and the lamp for the stop light compartment is indicated at 92' as before, it being understood that the stop light compartment may be provided with a reflector 85' as before, and that the lamps may be mounted and connected as in the previous embodiment.

Where the device is used at the front of the vehicle the tail and stop light combination may be omitted as indicated in Fig. 13, or the combination tail and stop light compartments may be replaced with a single circular or rectangular compartment for displaying the city license plate, professional insignia or the like.

In Fig. 14 the device is shown as provided with a depending or underlying support and display compartment 125 for supporting and displaying the city license plate, for example, and with a generally rectangular overlying compartment 126 for the name or make of the machine or any other desired designation.

In Fig. 15 the overlying and underlying supporting and display compartments 126' and 125' are both circular and substantially alike, one, for example, for the city plate and one for professional insignia or the like.

In the embodiment of Fig. 16 the overlying compartment 129 is substantially like the compartment 126 of Fig. 14 and the main license plate supporting and display compartment 128 is provided beyond each of its opposite ends with suitable supporting and display compartments 130.

The device illustrated in Fig. 17 is substantially like the device of Fig. 16 with the exception that the overlying generally rectangular compartment 128 of Fig. 16 is omitted.

The device of Fig. 18 is substantially like the device of Fig. 16 with the exception that the generally rectangular supporting and display compartment 132 underlies or is arranged below the main license plate supporting and display compartment 133 which is provided beyond its opposite ends with the supporting and display compartments 134.

It is to be understood that all of the above may be made with telescoping ends or as stationary integral units, and that various changes and modifications are contemplated.

I claim:

A license and rear light unit comprising a T-shaped lamp box having a vertical portion disposed centrally of its horizontal portion, said lamp box having an open front and the horizontal portion having also open ends, extensible end sections fitting over the open ends of the horizontal section of said box, said end sections having open fronts and ends in registration with the open portions of said box and closed ends opened thereto, a reflector shaped substantially as a quadrant of a sphere disposed at the top of the vertical portion of said box, said reflector dividing off a portion of that box to form a stop light compartment, a T-shaped semi-cylindrical reflector disposed in the T-section of said box, said reflector having open ends registering with the open ends of the box and a closed end registering with one side of said spherical reflector, an end reflector section disposed in each end section of the box and having an open end registering with the open end of the T-reflector and a rounded closed end registering with the closed end of the section, a stop light plate fitted into the open front of said first reflector, a license plate fitted over the open front of the horizontal part and end sections of said second reflector, a rear light plate fitted over the open front of the vertical part of said second reflector, and a single lamp for lighting said license plate and rear light plate.

In witness whereof, I hereunto subscribe my name this 1st day of October, 1928.

ANDREW G. JASINSKI.